United States Patent
Rajewski

Patent Number: 5,819,793
Date of Patent: Oct. 13, 1998

[54] BREATHER VALVE

[76] Inventor: Robert Karl Rajewski, R.R. #1, Donalda, Alberta, Canada, T0B 1H0

[21] Appl. No.: 885,187

[22] Filed: Jun. 30, 1997

[30] Foreign Application Priority Data

Jun. 27, 1997 [CA] Canada .................................. 2209163

[51] Int. Cl.$^6$ .................................................. F16K 15/00
[52] U.S. Cl. ........................................... 137/528; 137/511
[58] Field of Search ..................... 137/528, 514, 137/511; 138/30

[56] References Cited

U.S. PATENT DOCUMENTS

| | | | |
|---|---|---|---|
| Re. 32,553 | 12/1987 | Bennett et al. | 137/528 |
| 1,918,337 | 7/1933 | Jones . | |
| 2,317,923 | 4/1943 | Lebo et al. | 137/51 |
| 2,732,856 | 1/1956 | Jurs et al. | 137/469 |
| 2,879,786 | 3/1959 | Heideman | 137/329.06 |
| 3,235,225 | 2/1966 | Dickinson et al. | 251/175 |
| 3,269,411 | 8/1966 | Teston | 137/613 |
| 3,307,633 | 3/1967 | Newall | 169/22 |
| 3,394,732 | 7/1968 | Lisciani | 137/533.21 |
| 3,417,795 | 12/1968 | Hesse | 137/514 |
| 3,871,457 | 3/1975 | Livingston | 137/528 |
| 4,091,837 | 5/1978 | Edmunds et al. | 137/341 |
| 4,125,126 | 11/1978 | Davis, Jr. | 137/493.1 |
| 4,190,045 | 2/1980 | Bartels | 137/528 |
| 4,398,557 | 8/1983 | Dugge | 137/493.9 |
| 4,460,013 | 7/1984 | Milo | 137/493.4 |
| 4,475,899 | 10/1984 | Muller | 137/528 |
| 4,593,711 | 6/1986 | Morris | 137/39 |
| 4,948,342 | 8/1990 | Landquist | 137/514 |
| 5,048,560 | 9/1991 | Jannotta et al. | 137/493.8 |
| 5,165,444 | 11/1992 | Dean | 137/469 |
| 5,282,491 | 2/1994 | Higgins et al. | 137/489 |
| 5,333,635 | 8/1994 | Higgins et al. | 137/12 |

FOREIGN PATENT DOCUMENTS

| | | | |
|---|---|---|---|
| 5-332464 | 12/1993 | Japan | 137/511 |
| 2253679 | 9/1992 | United Kingdom | 137/511 |

OTHER PUBLICATIONS

Protectoseal Company Series No. 18540 Conservation Breather Vent with Pipe–Away product brochure, 2 pages, 1985.

Primary Examiner—Denise L. Ferensic
Assistant Examiner—Joanne Y. Kim
Attorney, Agent, or Firm—Anthony R. Lambert

[57] ABSTRACT

A breather valve has a valve body having a fluid passageway terminating in a valve seat, and a pressure pallet having a size commensurate with the valve seat. The pressure pallet has a sealing side oriented to face the valve seat, and is mounted for limited motion towards and away from the valve seat. A flexible diaphragm is secured to the sealing side of the pressure pallet circumferentially outside the valve seat, preferably around an outer periphery of the valve seat. The flexible diaphragm is separated from the sealing side between the first and second circumferences to create an annular cushion over the valve seat. The flexible diaphragm is fluid impervious outside of the valve seat and fluid pervious inside the valve seat.

20 Claims, 4 Drawing Sheets

5,819,793

BREATHER VALVE

FIELD OF THE INVENTION

This invention relates to breather valves.

BACKGROUND OF THE INVENTION

Various breather valves are known, such as those described in U.S. Pat. Nos. 5,048,560 issued Sep. 17, 1991; 3,394,732 issued Jul. 30, 1968; 3,235,225 issued Feb. 15, 1966; and 2,732,856 issued Jan. 31, 1956, that have a pressure pallet loosely biased against a valve seat with a diaphragm between the pressure pallet and the valve seat for assisting in sealing the breather valve. Although these breather valves have desirable features, it is believed that they do not supply even venting at very low pressures with a simple low cost design.

SUMMARY OF THE INVENTION

This invention seeks to provide a breather valve that overcomes disadvantages of the prior art breather valves. There is therefore provided according to a first aspect of the invention, a breather valve, comprising a valve body having a fluid passageway terminating in a valve seat, and a pressure pallet having a size commensurate with the valve seat. The pressure pallet has a sealing side oriented to face the valve seat, and is mounted for limited motion towards and away from the valve seat. A flexible diaphragm is secured to the sealing side of the pressure pallet circumferentially outside the valve seat, preferably around an outer periphery of the valve seat. The flexible diaphragm is separated from the sealing side over the valve seat to create an annular cushion over the valve seat. The flexible diaphragm is fluid impervious outside of the valve seat and fluid pervious inside the valve seat.

In a further aspect of the invention, the flexible diaphragm is secured to the sealing side of the pressure pallet around an inner circumference inside of the valve seat.

In a further aspect of the invention, the annular cushion extends further outward from the valve seat than inward from the valve seat.

In a further aspect of the invention, the pressure pallet has an annular indentation for receiving the valve seat.

In a further aspect of the invention, the pressure pallet has a depending flange forming an outer periphery of the valve seat.

In a further aspect of the invention, the depending flange extends inward from the outer periphery to form an angle between the depending flange and the pressure pallet.

In a further aspect of the invention, the flexible diaphragm is secured to the depending flange by a ring held within the angle between the depending flange and the pressure pallet.

In a further aspect of the invention, the flexible diaphragm is secured directly to the sealing side of the pressure pallet along the inner and outer circumference.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
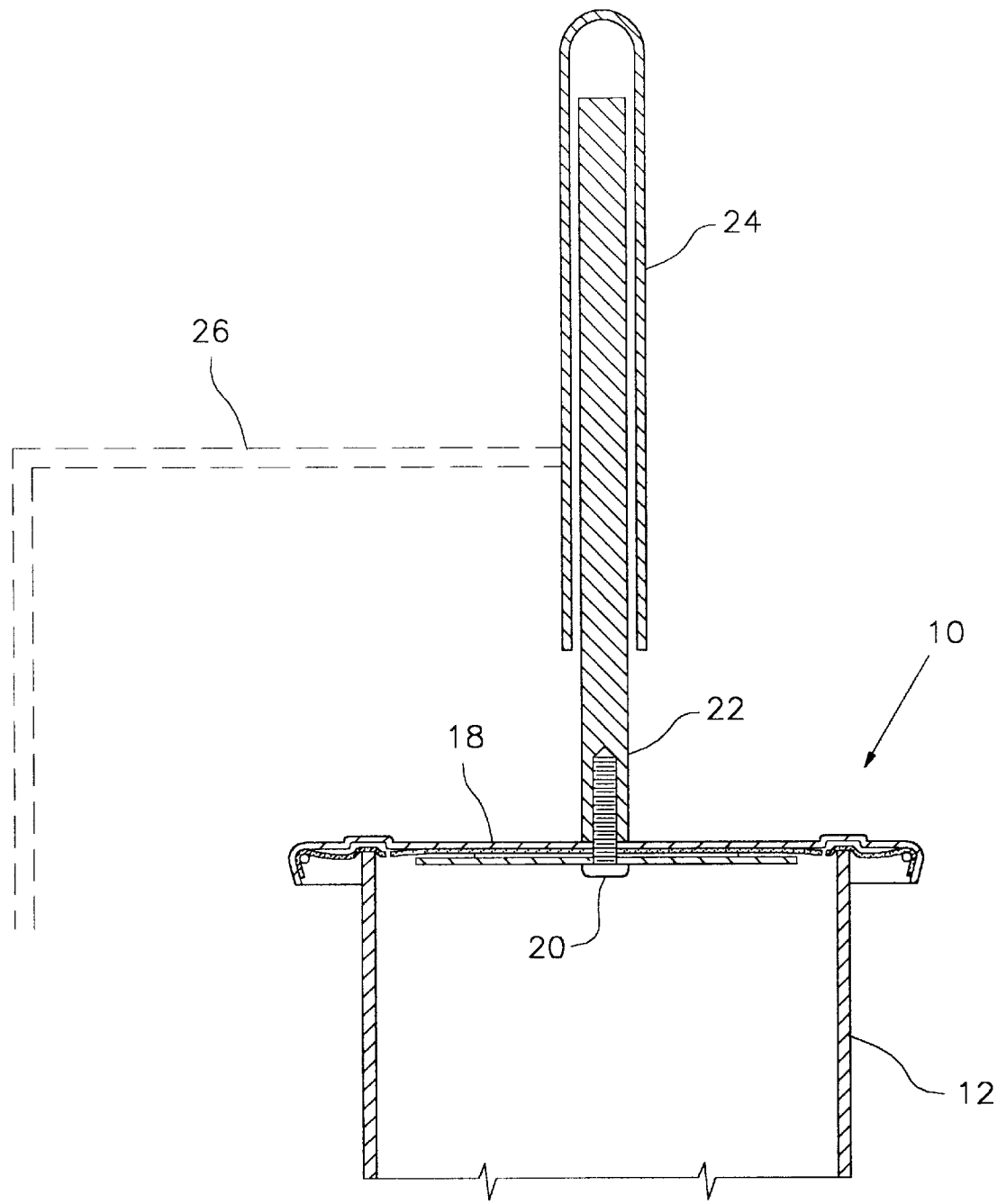
FIG. 1 is a side view of a valve according to the invention.

Referring to the figures, a breather valve 10 is formed from a valve body 12 having a fluid passageway 14 terminating in a valve seat 16. The valve 10 will have other conventional structural parts, as is well known to a person in the art. Only the features required for an understanding of the invention are shown and described.

A pressure pallet 18 is mounted closely adjacent the valve seat 16 for limited motion towards and away from the valve seat 16. For this purpose, the pressure pallet 18 is secured, as for example by screw 20, to a guide post 22. The guide post 22 in turn is received by a guide channel 24 which forms part of the valve body 12 as represented at 26. The pressure pallet 18 is free to move until it is prevented from movement downward towards the valve seat 16 by contact with the valve seat 16. Conventionally, the guide post 22 is mounted vertically, with the force moving the pressure pallet 18 towards the valve seat 16 being supplied by gravity, but the guide post 22 may be horizontal or have other orientations with the force, if not supplied by gravity, supplied by a spring or like means.

Figure 2:
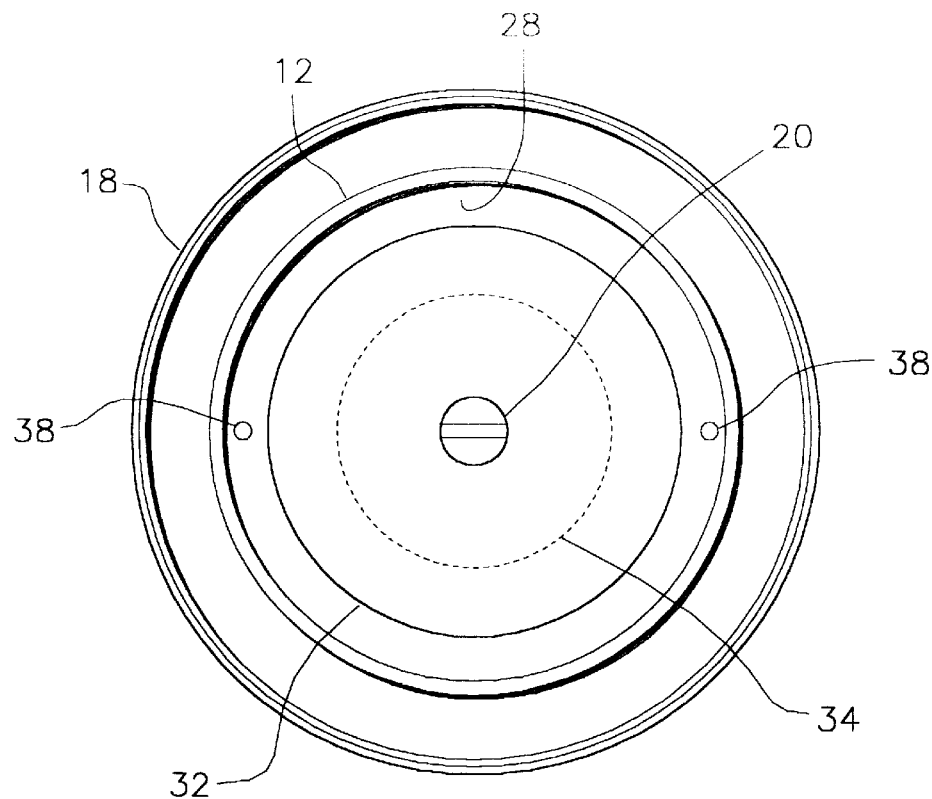
FIG. 2 is a bottom view of the pressure pallet shown in FIG. 1.
Figure 3:
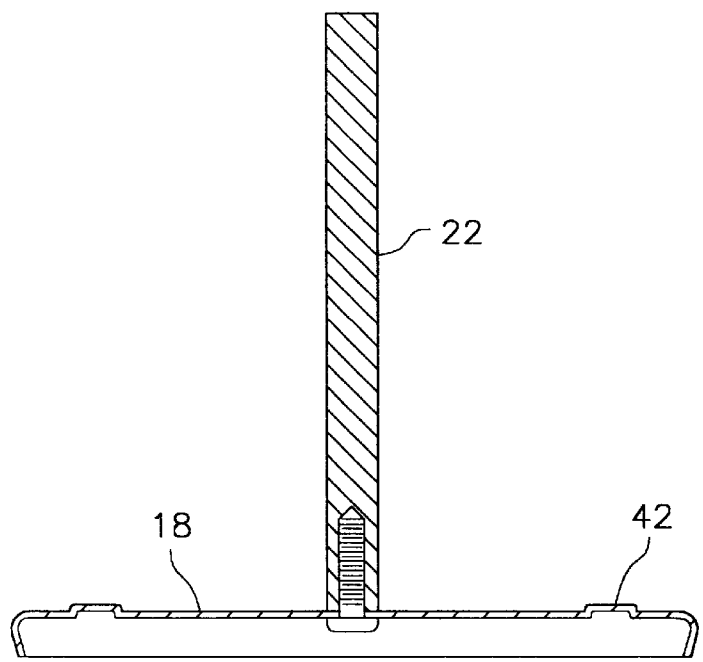
FIG. 3 is a side view of a pressure pallet with guide post for use according to the invention.
Figure 4:
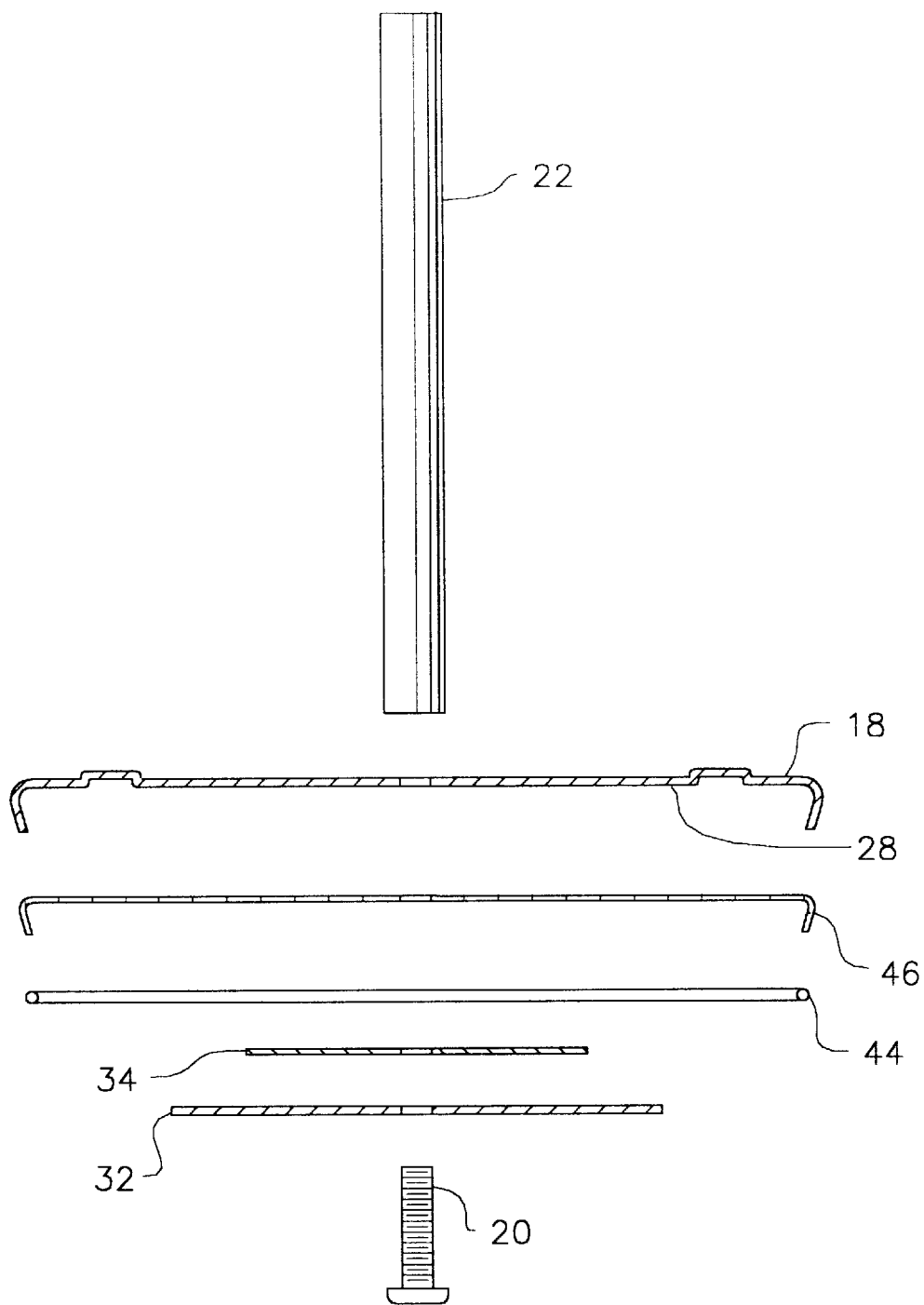
FIG. 4 is an exploded view of a pallet and guide system for use with the valve of FIG. 1.

The pressure pallet 18 has a size commensurate with the valve seat 16, such that the pressure pallet 18 is large enough to cover the fluid passageway 14 and extend beyond the valve seat 16 sufficiently for the purposes of this invention. The pressure pallet 18 has a sealing side 28 shown in FIG. 2 oriented to face the valve seat 16.

A flexible diaphragm 30 is secured to the sealing side 28 of the pressure pallet 18. The flexible diaphragm 30 is circular and has a central opening for receiving screw 20. Inside the valve seat 16, that is, within the fluid passageway 14, the flexible diaphragm 30 is preferably secured to the pressure pallet 18 by pressure from a plate 32 which also has a central opening for receiving screw 20. Securing the flexible diaphragm 30 in this manner prevents it from flapping during high flow rates of fluid through the breather valve. The flexible diaphragm 30 is squeezed between the plate 32 and the pressure pallet 18. A gasket 34 is located between the plate 32 and diaphragm 18. The plate 32 extends across the pressure pallet 18 close to the valve seat 16 to secure the flexible diaphragm 30 against the pressure pallet 18 around a first circumference inside the valve seat 16, which circumference coincides with the outer edge of the plate 32. The flexible diaphragm 30 has holes 38 to allow fluid to exit from the fluid passageway 14 past the diaphragm 18 into the space between the diaphragm 18 and the pressure pallet 18. The holes 38 render the flexible diaphragm fluid pervious on the inside of the valve seat 16 and may be located anywhere on the inside of the valve seat 16 between the valve seat 16 and the plate 32, or even inside of the edge of the plate 32 if the plate 32 is slotted. However, placing slots in the plate 32 requires alignment of the slots over the holes in the diaphragm and so is not preferred.

The flexible diaphragm 30 extends outward to the outer periphery 40 of the pressure pallet 18, and is secured to the pressure pallet 18 at the periphery 40, which forms a second circumference outside the valve seat 16. Between the plate 32 and the periphery 40, the flexible diaphragm 30 is not secured to the pressure pallet 18 and thus is separated from the sealing side 28 of the pressure pallet 18 between the plate 32 and the periphery 40. Separation of the flexible diaphragm 30 over this region creates an annular cushion 41 over the valve seat 16. In the region between the valve seat 16 and the periphery 40 of the pressure pallet 18,, namely outside of the valve seat, the flexible diaphragm 30 is fluid impervious. Preferably, the flexible diaphragm 30 is fluid impervious everywhere except at a few selected points (the holes 38) inside the valve seat 16.

Figure 5:
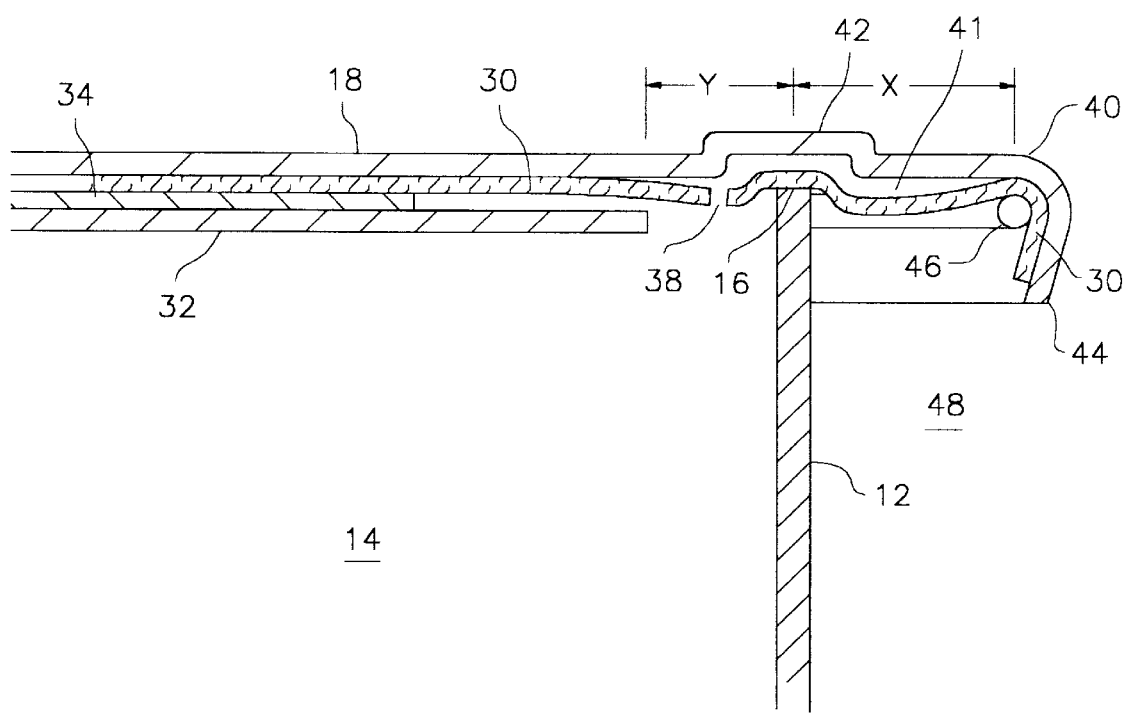
FIG. 5 is an enlarged view of a valve seat and pressure pallet according to the invention.

For best performance of the breather valve 10, the annular cushion 41 formed by the separation of the flexible diaphragm 30 from the pressure pallet 18 extends further outward from the valve seat 16 than inward from the valve seat 16. As shown in FIG. 5, this means that the distance X measured from the periphery 40 where the flexible diaphragm 30 contacts the pressure pallet 18 to the center of the valve seat 16 exceeds the distance Y measured from the center of the valve seat 16 to the edge of the plate 32. In general, the greater the distance X the better, as this increases the force applied by the diaphragm 30 onto the seat 16, subject to space and weight limitations. In the case of an unsecured flexible diaphragm on the inside of the valve seat the annular cushion 41 extends inwardly to the same extent as the flexible diaphragm extends inwardly. Such an unsecured diaphragm is not preferred since the diaphragm tends to flap during high flow rates.

For low pressure operations, the pressure pallet 18 preferably includes an annular indentation 42 extending around the pressure pallet 18 and having the same central radius as the valve seat 16. The indentation 42 should have a radial width slightly greater than the radial width of the valve seat 16 to allow the valve seat 16 to be received by the indentation 42.

The flexible diaphragm 30 is preferably secured to the pressure pallet 18 by the following mechanism. The pressure pallet 18 has a depending inwardly directed flange 44 forming the outer periphery 40 of the valve seat 16. The flange 44 thus forms, with the main portion of pressure pallet 18, an acute angle facing inward. A resilient ring 46 is held within the angle by being dimensioned such that it makes a close fit with the inner edge of the angle when the flexible diaphragm 30 is not installed. When the flexible diaphragm 30 is installed, the ring 46 compresses the flexible diaphragm 30 against the angle formed by the flange 44. The flexible diaphragm 30 is preferably secured directly to the sealing side 28 of the pressure pallet 18 along the inner circumference and along the inner circumference, without intervening material.

The flexible diaphragm 30 may be made from a fluid impervious chemically resistant material such as various fluorocarbons including polytetrafluoroethylene or a copolymer of perfluorinated propylene and ethylene, sold under the brand name TEFLON™ (TEFLON TFE or FEP), or other like material. Material sold under the brand name VITONM may also be used.

The pressure pallet 18 should be made of a lightweight stainless steel, and preferably should be light enough that low pressure operation, for example at ½ oz, may be obtained.

The breather valve operates as follows. When a positive pressure differential arises between the fluid passageway 14 and the area 48 outside of the fluid passageway 14, fluid enters the fluid cushion 41 through holes 38. This fluid presses the flexible diaphragm 30 against the valve seat 16. The pressure differential may be formed by an increase in pressure in the area 14 or a vacuum condition in the area 48. In either instance, the pressure between the flexible diaphragm 30 and the pressure pallet 18 rapidly rises evenly around the fluid cushion 41 to cause an even positive seal around the valve seat 16. This reduces the leak rate of the seal even at very low pressures around ½ oz.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A breather valve, comprising:

a valve body having a fluid passageway terminating in a valve seat;

a pressure pallet having a size commensurate with the valve seat, the pressure pallet having a sealing side oriented to face the valve seat, the pressure pallet being mounted for limited motion towards and away from the valve seat;

a flexible diaphragm secured to the sealing side of the pressure pallet around a first circumference inside the valve seat and around a second circumference outside the valve seat, and separated from the sealing side between the first and second circumferences to create an annular cushion over the valve seat, whereby upon creation of a pressure differential between the inside and outside of the valve body pressure within the annular cushion forces the flexible diaphragm against the valve seat;

the flexible diaphragm being fluid impervious outside of the valve seat; and the flexible diaphragm being fluid pervious inside the valve seat.

2. The breather valve of claim 1 in which the annular cushion extends further outward from the valve seat than inward from the valve seat.

3. The breather valve of claim 2 further comprising an annular indentation in the pressure pallet for receiving the valve seat.

4. The breather valve of claim 3 in which the flexible diaphragm is secured to the pressure pallet along an outer periphery of the pressure pallet.

5. The breather valve of claim 4 in which the pressure pallet has a depending flange forming an outer periphery of the valve seat.

6. The breather valve of claim 5 in which the depending flange extends inward from the outer periphery to form an angle between the depending flange and the pressure pallet.

7. The breather valve of claim 5 in which the flexible diaphragm is secured to the depending flange by a ring held within the angle between the depending flange and the pressure pallet.

8. The breather valve of claim 1 in which the flexible diaphragm is secured directly to the sealing side of the pressure pallet along the inner circumference.

9. The breather valve of claim 1 in which the flexible diaphragm is secured directly to the sealing side of the pressure pallet along the outer circumference.

10. The breather valve of claim 1 in which the flexible diaphragm is secured to the pressure pallet along an outer periphery of the pressure pallet.

11. The breather valve of claim 10 in which the pressure pallet has a depending flange forming an outer periphery of the valve seat.

12. The breather valve of claim 11 in which the depending flange extends inward from the outer periphery to form an angle between the depending flange and the pressure pallet.

13. The breather valve of claim 11 in which the flexible diaphragm is secured to the depending flange by a ring held within the angle between the depending flange and the pressure pallet.

14. The breather valve of claim 10 in which the flexible diaphragm is secured directly to the sealing side of the pressure pallet along the inner circumference.

15. The breather valve of claim 10 in which the flexible diaphragm is secured directly to the sealing side of the pressure pallet along the outer circumference.

16. A breather valve, comprising:

a valve body having a fluid passageway terminating in a valve seat;

a pressure pallet having a size commensurate with the valve seat, the pressure pallet having a sealing side oriented to face the valve seat, the pressure pallet being mounted for limited motion towards and away from the valve seat;

a flexible diaphragm secured to the sealing side of the pressure pallet outside the valve seat, the flexible diaphragm extending inside the valve seat, and being separated from the sealing side over the valve seat to create an annular cushion over the valve seat, whereby upon creation of a pressure differential between the inside and outside of the valve body pressure within the annular cushion forces the flexible diaphragm against the valve seat;

the flexible diaphragm being fluid impervious outside of the valve seat;

the flexible diaphragm being fluid pervious inside the valve seat; and the annular cushion extending further outward from the valve seat than inward from the valve seat.

17. The breather valve of claim 16 further comprising an annular indentation in the pressure pallet for receiving the valve seat.

18. The breather valve of claim 16 in which the flexible diaphragm is secured to the pressure pallet along an outer periphery of the pressure pallet.

19. The breather valve of claim 18 in which the pressure pallet has a depending flange forming an outer periphery of the valve seat.

20. The breather valve of claim 19 in which the depending flange extends inward from the outer periphery to form an angle between the depending flange and the pressure pallet.

* * * * *